June 3, 1969 A. E. DRAPER 3,447,808
SOUND REPRODUCING APPARATUS
Filed June 1, 1967

INVENTOR
ALBERT E. DRAPER
BY Richards & Cifelli
ATTORNEYS

United States Patent Office 3,447,808
Patented June 3, 1969

3,447,808
SOUND REPRODUCING APPARATUS

Albert E. Draper, London, England, assignor to S. Korobuk Limited, London, England Filed June 1, 1967, Ser. No. 642,848
Int. Cl. G11b *17/12*
U.S. Cl. 274—10 5 Claims

ABSTRACT OF THE DISCLOSURE

Record-operated means for controlling the sizing mechanism of a disc record player comprising a main arm swinging in a vertical plane and operatively coupled to a stop for determining the starting position of the pick-up stylus on a record, a trigger arm mounted on the main arm to be contacted by records dropping on to the turntable, and fixed stops engaged by a part associated with said main arm which part is disengaged from a first stop by the fall of any record over a first predetermined size and carried past a second stop by the fall of any record of a second, larger predetermined size, the trigger arm moving substantially horizontally during the swinging of the main arm.

Figure 1:
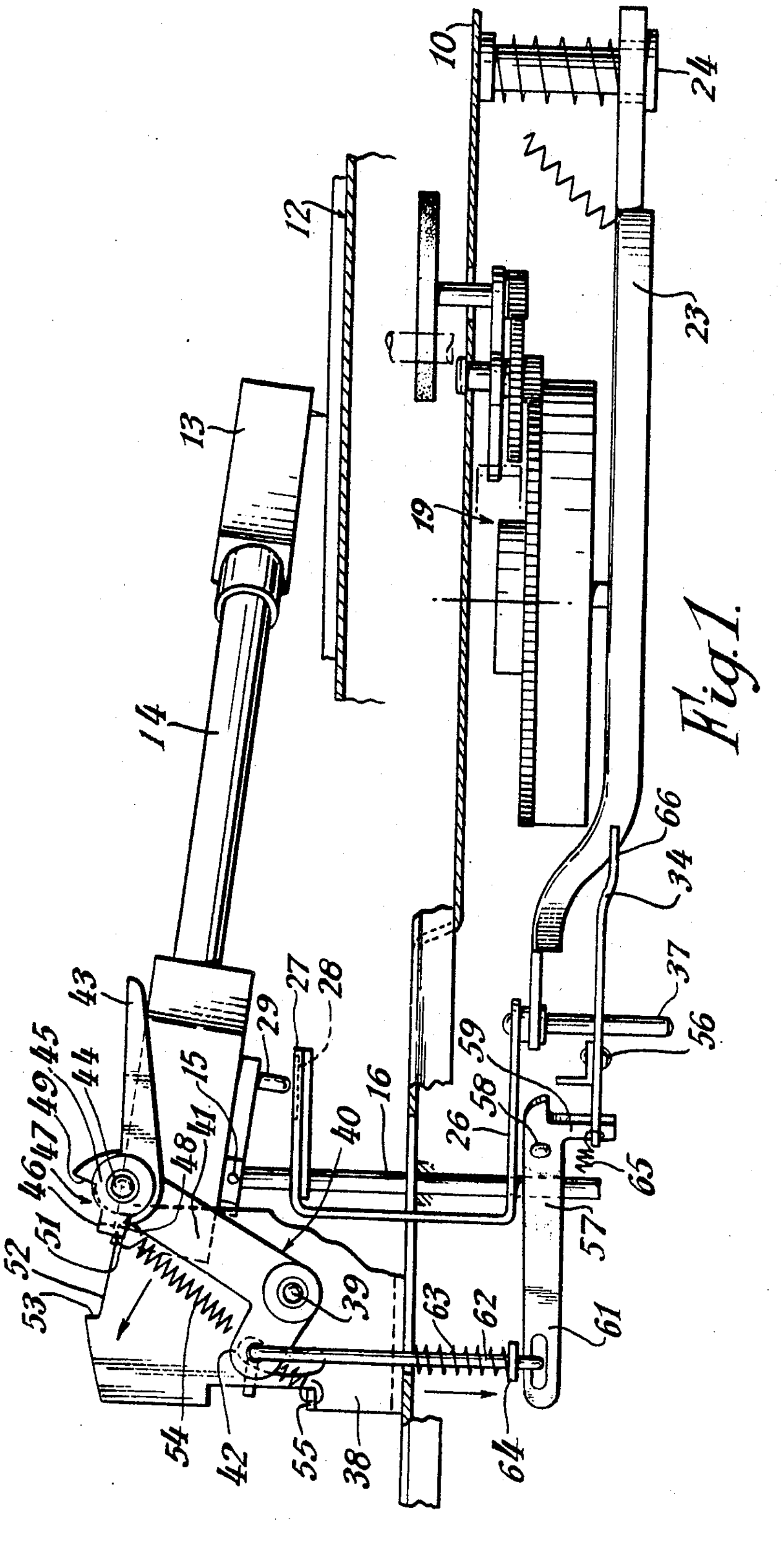

This invention relates to sound reproducing apparatus using disc-shaped records and having automatic means for setting the position of the pick-up for starting to play a record in accordance with the size of the record. Various forms of such automatic means have been proposed, the said means usually being operated by a trigger arm which is acted upon by a record as the said record falls from a stack supported above the turntable on which the records are played, on to the said turntable.

It is the object of the invention to provide an improved trigger arm arrangement which can be used to set stop means determining the inward swing of the pick-up to its starting position, the form of the stop, and the manner in which it limits the inward swing of the pick-up arm forming no part of the present invention.

According to the present invention, in record sizing means for sound reproducing apparatus of the kind comprising a turntable to support disc-shaped records for playing, means for supporting a stack of records above the turntable and means to release said records one-by-one so that they fall on to the turntable, a pick-up arm, means for swinging the pick-up arm inwardly to bring the pick-up to a starting position on a record, and means to select the position to which the pick-up is swung inwardly in accordance with the size of the record, sizing means controlling the said position-selecting means for the pick-up comprise a main arm pivotally mounted to swing in a vertical plane intersecting the edges of records located on or above the turntable, spring loading means acting on the said main arm to urge its upper end to swing outwardly, a trigger arm pivotally mounted on said upper end of said main arm and projecting inwardly into the paths of records falling from the stack on to the turntable, spring means acting to urge the trigger arm upwardly about its pivot, a fixed stop, means associated with said main arm to engage said fixed stop and hold the main arm in an inward position, at least one other fixed stop adapted to be engaged by the stop engaging means to hold the main arm in another position outward of the first-mentioned position, the trigger arm being operable to disengage the stop-engaging means from the first mentioned stop by a falling record engaging the said trigger arm and allowing said stop-engaging means to engage said other stop only if said trigger arm has moved clear of the edge of the falling record before the said stop-engaging means reaches its position for engagement with said other stop, and means connecting said main arm to the position-selecting means.

In apparatus for playing records of three different sizes, the first stop is so positioned that a record of the smallest size falls without touching the trigger arm, a record of intermediate size engages the said trigger arm during falling but is cleared by it before it reaches the said other stop, and a record of the largest size holds the said trigger arm down until it has moved past the second stop.

Figure 2:
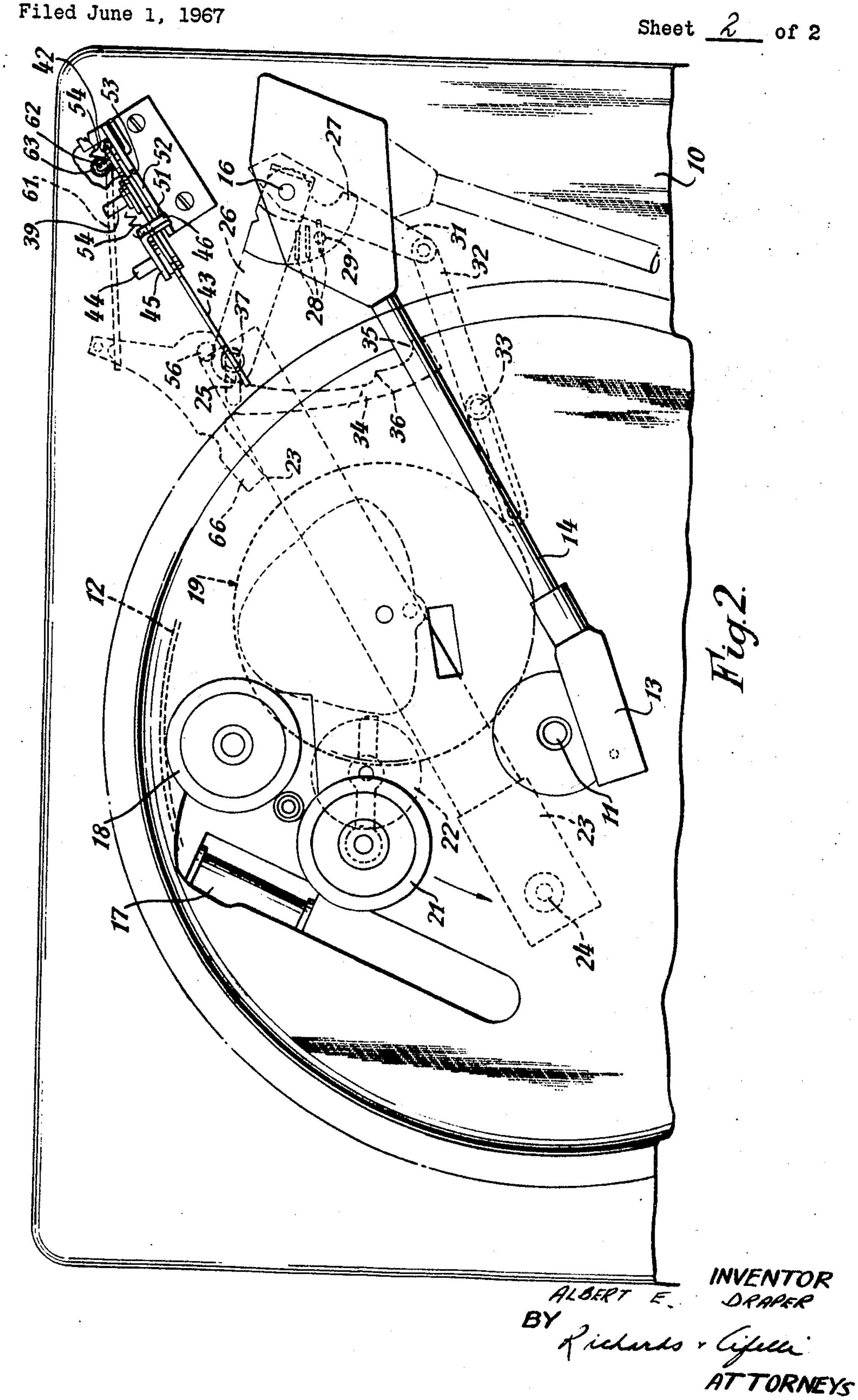

The invention is hereinafter described with reference to the accompanying drawings, in which:

FIGURE 1 is a side elevation, partly in section, of a sound reproducing apparatus embodying the invention, some parts of the apparatus being omitted, and FIGURE 2 is a plan view of the apparatus shown in FIGURE 1.

Referring to the drawings, the base or motor board of a sound reproducing apparatus is shown at 10, and a turntable, mounted on a spindle 11 (FIGURE 2) projecting through the motor board, is indicated at 12. The spindle 11 is constructed in the well known manner to support a stack of records above the turntable and to enable them to be released one-by-one. A pick-up 13 is mounted on a pick-up arm 14, the arm 14 being movable about a horizontal axis at 15 relative to a vertical spindle 16 mounted in bearings in the motor board to enable the pick-up arm to swing horizontally about the axis of the said spindle 16. The turntable is driven by an electric motor 17 through a friction wheel 18 (FIGURE 2), and the movements of the pick-up arm at the commencement and at the termination of the playing of a record, as well as the dropping on to the turntable of records stacked above it in the conventional manner, are controlled by a cycling cam mechanism 19 also driven by the electric motor 17 through a friction wheel 21 and toothed gearing 22, the cycling cam making one complete revolution to cause the pick-up to lift clear of the record in a vertical sense, swing outwardly clear of the record in a horizontal sense, swing inwardly to the starting position for a following record, and move downwardly to engage that record, whilst the pick-up is clear of the record in the horizontal sense, a record-dropping mechanism is operated by the cycling cam to allow the following record to drop on to the turntable.

During each revolution of the cycling cam mechanism 19, an arm 23, pivoted at 24 on the motor board 10 makes a to-and-fro angular movement about its pivot, the said arm 23 being coupled by a pin-and-slot connection at 25 to an arm 26 movable about and slidable on the spindle 16 the arm 26 having movable with it a quadrant 27 in which are formed a plurality of V-shaped grooves 28. A dependent pin 29 carried by the pick-up arm 14 co-operates with the grooves 28 as will be hereinafter described, to enable the pick-up arm to be located in, and temporarily retained in, any one of a number of selected angular positions relative to the arm 26. The maximum outward swing of the pick-up arm is limited by an arm 31 fixed to the lower end of the spindle 16 and a slotted link 32 pivoted to the arm 31, a pin 33 fixed in the motor board 10 extending through the slot in the link 32.

The arm 23, besides being movable in a horizontal plane, is movable angularly about its end which is pivoted to the motor board in a vertical sense under the control of the cycling cam mechanism to move the arm 26 and quadrant 27 up and down, leaving the pick-up arm free of all restraint in a horizontal direction whilst it is in engagement with a record by moving the quadrant 27 downwardly clear of the pin 29, but lifting the said quadrant upwardly to lift the pick-up clear of a record when the playing thereof is ended and maintaining it in a raised position until it has swung inwardly to the starting position for the next record.

The grooves 28 in the quadrant 27 are so positioned that when the quadrant 27 is lifted at the end of the playing of a record the pin 29 engages in one of them, or is brought almost immediately into engagement with it by initial swinging of the arm 23, the travel of the arm 23 being such that only a part of its maximum travel is necessary to bring the pick-up arm 14, with the pin in this notch, to its maximum outward position. Continued travel of the arm 23, the extent of which is determined by a sizing mechanism hereinafter described, moves the quadrant 27 relative to the pick-up arm to cause another groove 28 in the said quadrant to be engaged by the pin 29, so that, on return movement of the said arm 23, the inward movement of the pick-up arm depends on its total outward movement.

The sizing mechanism controls a stop arm 34 limiting the angle of movement of the arm 23, the stop arm 34 having two stop surfaces 35 and 36 either of which, depending on the position of the stop arm, lies in the path of the pin 37 of the pin-and-slot connection 25.

The sizing mechanism comprises a bracket 38 upstanding from the motor board 10 and having pivoted to it at 39 a main arm 40 in the form of a bell-crank lever movable in a vertical plane intersecting the edges of records on and above the turntable, one limb 41 of the said bell-crank lever extending generally upwardly and the other limb 42 thereof extending generally outwardly away from the turntable centre, a trigger arm 43 being pivotally mounted by means of a pin 44 on the upper end of the limb 41 of the main arm. A disc 45 also mounted on the pin 44 has formed on it a lug 46 extending parallel to the pin 44. The trigger arm 43 is cut away at 47 to provide two spaced radial edges 48 and 49 co-operating with the lug 46 to limit angular movement of the trigger arm relative to the disc 45. The bracket 38, at its upper edge, is shaped to provide a first vertical stop 51 adjacent the inner edge of the bracket, a ramp 52 extending outwardly from the stop 51 and inclined upwardly towards a second vertical stop 53 beyond which the said upper edge of the bracket is curved outwardly and downwardly. The inclination of the ramp 52 is preferably such that, as the lug 46 rides outwardly along it, the free end of the trigger arm tends to move slightly upwardly so that, if the said trigger arm remains in engagement with a record during its travel along the ramp, only a very slight downward movement of the record is necessary to lift the lug over the second stop 53. A tension spring 54, connected at one end to the lug 46, and at the other end to an anchorage lug 55 on the bracket 38, urges the lug 46 into engagement with the top edge of the bracket 38. The stop arm 34, as shown in FIGURE 1, moves in a horizontal plane and is pivotally mounted at 56 on motor board 10, a bell-crank lever 57, pivotally mounted at a fixed point at 58, has an arm 59 engaging the edge of the stop arm 34 and a substantially horizontal arm 61 coupled by a rigid link 62 to the limb 42 of the main arm 40. A compression spring, 63 surrounding the link 62 between the underside of the motor board 10 and a stop 64 on the link 62 urges the said main arm anti-clockwise about its pivot as shown in FIGURE 1 to urge the trigger arm outwardly, and a lighter tension spring 65, acting on the stop arm 34, holds it against the arm 59 of the bell-crank lever 57. An additional limb 66 on the stop arm 34 is so positioned as to be engaged by the arm 23 as it returns to its initial position, thus returning the main arm 40 and trigger arm 43 to their initial positions.

The operation of the sizing mechanism herein described is as follows. When the trigger arm 43 is held by engagement of the lug 46 with the stop 51 in its innermost position, as shown in FIGURE 1, the stop arm 34 is in such a position that neither of the stop surfaces 35 and 36 is in the path of the pin 37, and the arms 23 and 26, with the quadrant 27, can travel through their full range of movement.

A record of the smallest size usable with the apparatus (e.g., 7 inches diameter) can fall on to the turntable without touching the trigger arm 43, so that, when such a record drops on to the turntable the stop arm is not displaced. The full movement of the arm 23 is such that the quadrant 27 and the pick-up arm 14 are brought into such a relation that the pick-up swings in to a position to engage the starting groove of a record of this size.

A record of an intermediate size (e.g., 10 inches diameter), when falling on to the turntable, engages the trigger arm close to its tip and causes the lug 46 to be lifted clear of the stop 51, so that it is caused by the spring 63 to ride up the ramp 52. The trigger arm 43, however, rides clear of the record before the lug 46 reaches the stop 53, and the main arm 40 is thus brought to a position in which the lug 46 engages that stop. The movement of the main arm brings the stop arm 34 to a position in which the stop surface 35 thereon lies in the path of the pin 37, so that the travel of the arm 23 is reduced, and the pick-up is swung in to a lesser amount, and comes to a position opposite the starting groove of the record of intermediate size.

A record of the largest size (e.g., 12 inches diameter), when falling on to the turntable, engages the trigger arm 43 and holds it down until the lug 46 has passed over the stop 53, so that the main arm 40 swings outwardly to a greater extent and brings the stop surface 36 on the stop arm 34 into the path of the pin 37. Thus the travel of the arm 23 is still further reduced, and the pick-up is brought inwardly to the starting position for the largest size of record.

During the final part of the return movement of the arm 23 to its initial position it engages the limb 66 of the stop arm 34 and swings the stop arm back to its initial position, thus re-setting the main arm 40 and trigger arm 43 with the lug 46 in engagement with the stop 51.

The mechanism herein described for moving the pick-up arm during a record change cycle is fully described in our copending Cognate patent applications Nos. 26,339/64 and 5,779/65.

In previously proposed trigger arm arrangements for controlling the setting of pick-up arms in sound reproducing apparatus, the trigger arm has been mounted on a fixed horizontal pivot, and its movement, when engaged by a record, has been a downward swinging movement. Thus, the vertical distance between the lowest record in the stack on the spindle, and the topmost record of a pile on the turntable, had to be sufficient to accommodate swinging movement through an arc sufficient to clear the largest record size. Since the downward swing of the trigger arm in the present arrangement is only very small, and its main movement is substantially horizontal, it requires very little vertical space, and either the height above the turntable of the bottom of the stack can be reduced, or more records can be played without stopping the machine. The total height of the apparatus is then governed by the thickness of the pick-up head.

I claim:

1. In a record sizing means for sound reproducing apparatus of the kind comprising a turntable to support disc-shaped records for playing, means for supporting a stack of records above the turntable and means to release said records one-by-one so that they fall on to the turntable, a pick-up arm, means for swinging the pick-up arm inwardly to bring the pick-up to a starting position on a record, and means to select the position to which the pick-up is swung inwardly in accordance with the size of the record, the improvement which comprises sizing means for controlling the said position-selecting means for the pick-up which comprises a main arm pivotally mounted to swing in a vertical plane intersecting the edges of records located on or above the turntable, spring loading means acting on the said main arm to urge its upper end to swing outwardly, a trigger arm pivotally mounted on said upper end of said main arm and projecting inwardly into the path of records falling from the stack on to the turntable, spring means acting to urge the trigger arm upwardly about its pivot, a fixed stop, means associated with said main arm to engage said fixed stop and hold the main arm in an inward position, at least one other fixed stop adapted to be engaged by the stop engaging means to hold the main arm in another position outward of the first-mentioned position the trigger arm being operable to disengage the stop-engaging means from the first mentioned stop by a falling record engaging the said trigger arm and allowing said stop-engaging means to engage said other stop only if said trigger arm has moved clear of the edge of the falling record before the said stop-engaging means reaches its position for engagement with said other stop, and means connecting said main arm to the position-selecting means.

2. Record sizing means according to claim 1, for use with apparatus for playing records of three different sizes, wherein the first stop is so positioned that a record of the smallest size falls without touching the trigger arm, a record of intermediate size engages the said trigger arm during falling but is cleared by it before it reaches the said other stop, and a record of the largest size holds the said trigger arm down until it has moved past the second stop.

3. Record sizing mechanism according to claim 1 wherein the trigger arm is freely movable about a pivot pin on the main arm, and said means associated with said main arm to engage said fixed stop is a member mounted on the same pivot pin which carries a lug engageable with the fixed stops, co-operating surfaces on the trigger arm and member acting to support the trigger arm in a substantially horizontal position and the said member being urged about the pivot pin in a direction to urge the lug downwardly and oppose downward movement of the trigger arm by a spring, a downward load on the trigger arm overcoming the said spring and lifting the lug clear of at least one of the stops.

4. Record sizing mechanism according to claim 2, wherein the trigger arm is freely movable about a pivot pin on the main arm, and a member mounted on the same pivot pin carries a lug engageable with the fixed stops, co-operating surfaces on the trigger arm and member acting to support the trigger arm in a substantially horizontal position and the said member being urged about the pivot pin in a direction to urge the lug downwardly and oppose downward movement of the trigger arm by a spring, a downward load on the trigger arm overcoming the said spring and lifting the lug clear of at least one of the stops.

5. Record sizing mechanism according to any preceding claim wherein the main arm is a bell-crank lever pivoted at its elbow, one arm of the said bell-crank lever carrying the trigger arm and the other arm being connected to the position-selecting means.

References Cited

UNITED STATES PATENTS 2,950,921 8/1960 Guest ---------------- 274—10

FOREIGN PATENTS 817,510 7/1959 Great Britain.

HARRY N. HAROIAN, *Primary Examiner.*